Sept. 20, 1960 E. P. TROLAND 2,953,248
APPARATUS FOR CLEARING RESTRICTED ORIFICE
Filed March 28, 1956 2 Sheets-Sheet 1
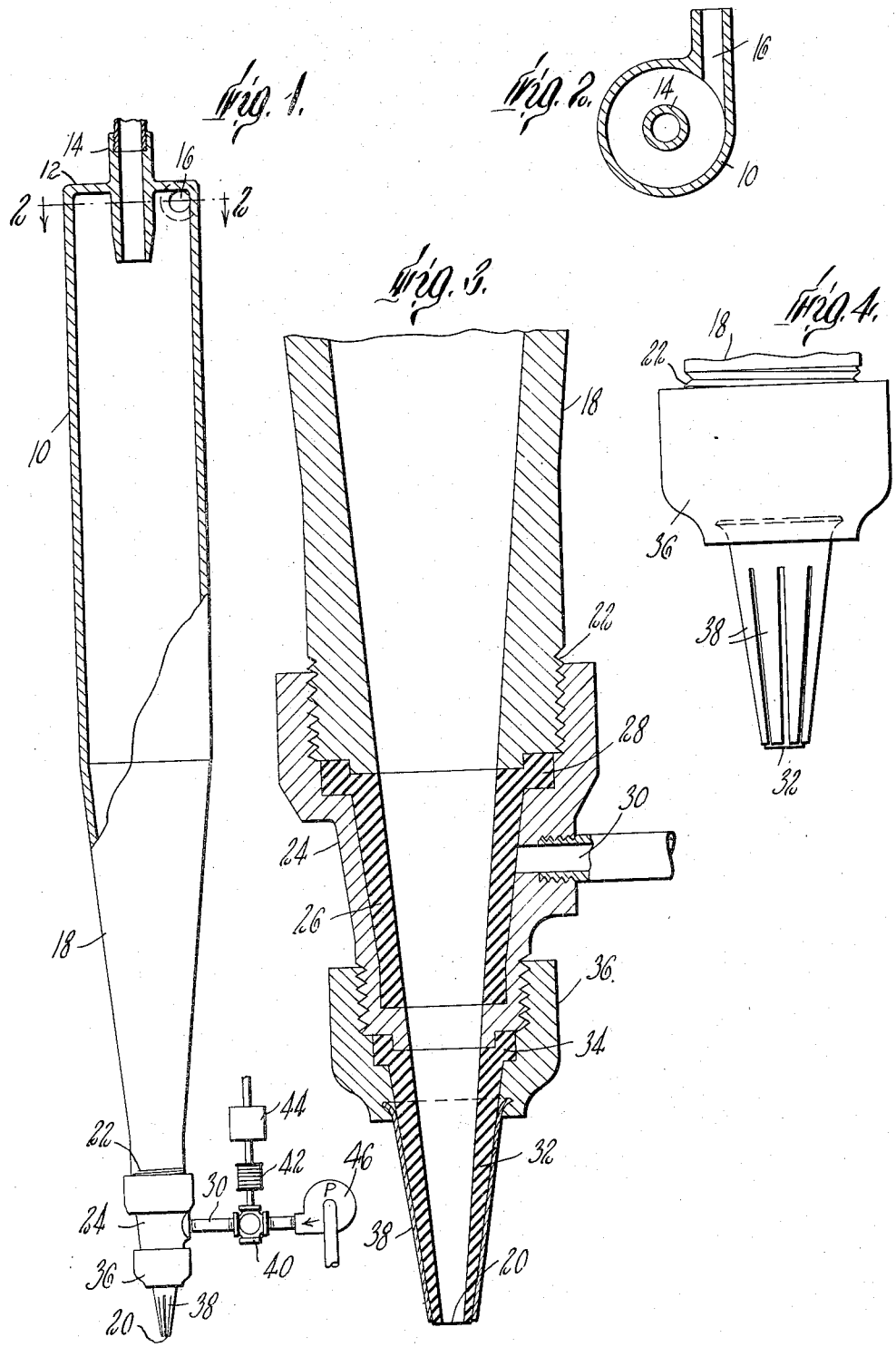

Sept. 20, 1960 E. P. TROLAND 2,953,248
APPARATUS FOR CLEARING RESTRICTED ORIFICE
Filed March 28, 1956 2 Sheets-Sheet 2

United States Patent Office 2,953,248
Patented Sept. 20, 1960

2,953,248

APPARATUS FOR CLEARING RESTRICTED ORIFICE

Edwin P. Troland, Hingham, Mass., assignor to Bird Machine Company, South Walpole, Mass., a corporation of Massachusetts Filed Mar. 28, 1956, Ser. No. 574,493

6 Claims. (Cl. 210—251)

This invention relates to apparatus for clearing restricted outlets through which a fluid suspension of solid particles is adapted to pass and pertains more specifically to apparatus for clearing the restricted outlet of a cyclone separator, particularly a cyclone type separator adapted for the purification of aqueous paper pulp suspensions.

Cyclone separators normally have a restricted outlet at one end for passing solid particles separated from the fluid suspension which is being treated. In order to provide maximum effectiveness this outlet must be of restricted size, particularly when the separator is intended to be operated to separate selectively from a suspension or dispersion particles which differ only slightly in specific gravity from other particles which are to be retained. This is particularly true in the case of cyclone type separators adapted for use in the purification of paper pulp suspensions. The impurities to be removed from such paper pulp suspensions normally are small particles of pitch, resin, wood sticks, dirt, etc., which have particle sizes of the same order of magnitude as the pulp fibers and which differ only slightly in specific gravity from these pulp fibers. In the case of such apparatus, the restricted pulp outlet normally has a diameter from about 1/16 to 1/4 inch, only slightly greater than the diameter of the particles to be passed. Accordingly, there is a tendency for the restricted outlet in such an apparatus to become plugged or obstructed by an accumulation of particles within the outlet.

One object of the present invention is to provide a construction which facilitates clearing restricted outlets adapted to pass particles of solid material.

Another object is to provide a construction for the restricted waste outlet of a cyclone separator which can readily be freed of obstructions without interruption of the flow of purified material from the separator.

Still another object is to provide a means for temporarily closing off such an outlet from the main body of the separator while clearing the outlet.

Other and further objects will be apparent from the drawings and from the description which follows.

In the drawings:

Fig. 1 is a view in side elevation, partly broken away and in section, of one embodiment of the invention;

Fig. 2 is a section taken along the line 2—2 of Fig. 1;

Fig. 3 is a view in section on an enlarged scale of the lower portion of Fig. 1;

Fig. 4 is a view in side elevation on an enlarged scale of the lower portion of the device shown in Fig. 1.

Figure 5:
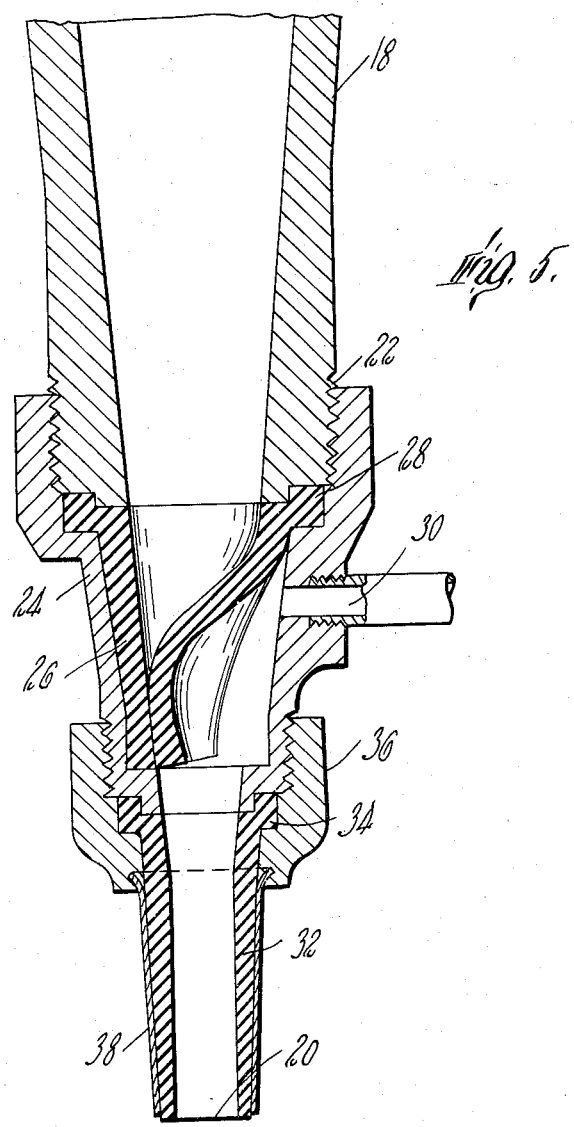
Fig. 5 is a view corresponding to Fig. 3 showing the device in operation.

Although there is shown in the drawings only one embodiment of the invention as adapted for use on a cyclone separator suitable for purifying paper pulp suspensions, it will be understood that the principle of the present invention is readily adapted for use with other restricted outlets adapted to pass particles of solid material with only minor modifications which will be obvious to those skilled in the art.

In the embodiment shown in the drawings, a cyclone separator is shown comprising an elongated chamber of generally circular cross-sectional configuration and including a generally cylindrical body portion 10 closed at its base end by an end wall 12 through which outlet 14 extends for the passage of the purified pulp suspension which constitutes the main output of the device. An inlet 16 for the pulp suspension to be purified is arranged to deliver a stream of the pulp suspension tangentially to the wall of cylindrical portion 10, the stream passing spirally along the inner face of cylindrical portion 10 in a direction away from end wall 12. An extension including conical portion 18 in axial alignment with cylindrical portion 10 extends away from the end of cylindrical portion 10 opposite end wall 12 and terminates at its vertex in a restricted exit orifice 20 which is adapted to pass the solid particles of impurities which are separated from the pulp suspension. The device generally is constructed of any suitable rigid material such as steel, stainless steel, etc., conical portion 18 terminating adjacent the restricted outlet in an externally threaded portion 22. An outlet tip comprising a rigid extension 24 and a flexible elastic member 32 is threadedly mounted on conical portion 18. Within extension 24 is disposed a flexible, elastic, rubber-like tubular sleeve check valve member 26 provided with a radially outwardly extending flange 28 at its inlet end, flange 28 being engaged between extension 24 and the end of conical portion 18 to secure the tubular member 26 in place against the inner face of extension 24 with the exit end of tubular member 26 being free to collapse radially inwardly away from the wall of extension 24. A supplemental inlet 30 is provided through the wall of extension 24 and is connected to a suitable source of fluid under pressure such as pump 46. This pressure fluid may be air, steam, water, or any other suitable pressure fluid depending upon the nature of the suspension being purified. Valve 40 is actuated by a solenoid 42 which is energized at periodic intervals by means of timer switch 44 connected to any suitable source of current, thus providing an intermittent stream of pressure fluid into inlet 30. Mounted on the exit end of extension 24 is a generally conical outlet 32 which tapers in cross-sectional area toward its exit end, exit orifice 20 being smaller than the remainder of the internal passageway of member 32. Outlet 32 consists of a flexible, elastic, rubber-like material which is radially expansible when subjected to internal pressure greater than the normal operating pressure of the device and is secured in place by means of an annular projecting flange 34 held under compression against the exit end of extension 24 by means of a lock ring 36. Mounted on lock ring 36 and overlying outlet 32 are a plurality of axially extending, resiliently flexible, metallic leaf springs 38, 38 which serve to support outlet 32 and to aid in its operation as will be hereinafter described. Outlet member 32 terminates at its exit end in the restricted outlet or orifice 20 through which the solid particles of impurities pass from the separators.

In operation of the device the aqueous paper pulp suspension to be purified is introduced through inlet 16 at a relatively high rate of speed in a direction tangential to the wall of cylindrical portion 10 resulting in the formation of a vortex with the stream of pulp suspension passing spirally downwardly along the inner wall of cylindrical portion 10 and conical portion 18 to a zone close to outlet 20 at the vertex. The central vortex established results in a return stream of the pulp suspension passing along the axis of the apparatus and emerging through outlet 14. Because of the centrifugal forces set up through the whirling of the suspension and the slight differences in specific gravity between the small particles of dirt or other impurities and the specific gravity of the pulp fibers, the dirt particles tend to separate from the suspension and to pass outwardly through restricted outlet orifice 20 along with a small quantity of liquid medium.

When outlet member 32 becomes obstructed by the wedging of the dirt particles within its tapering passage, continued operation of the device will normally result simply in the accumulation of further dirt particles within outlet member 32. No substantial increase of pressure within the chamber above normal operating pressure occurs because main outlet 14 is relatively large as compared with restricted orifice 20. When this condition occurs in the device of the present invention, a stream of fluid under pressure is introduced through passage 30, causing tubular member 26 to collapse radially upon itself, thus sealing off cylindrical portion 10 and conical portion 18 from outlet member 32 and directing the stream of pressure fluid toward the exit end of this member to wash or flush the accumulated particles therefrom. In addition, collapse of tubular valve member 26 permits the internal pressure within outlet 32 (which is obstructed by the accumulated small particles) to be increased above normal operating pressure, thus expanding member 32 radially and enlarging orifice 20 to facilitate expulsion of the obstructed particles therethrough. As soon as the obstruction has been removed (which normally requires supplying the stream of pressure fluid for only a few seconds) the supply of pressure fluid through passage 30 may be halted, permitting elastic tubular member 26 to expand again to its original configuration and permitting outlet member 32 to contract to its normal shape, thus permitting separation of the dirt particles from the pulp suspension to continue. No interruption of the flow of suspension through inlet 16 and outlet 14 is required during the clearing of restricted outlet 32. Timer switch 44 and solenoid 42 provide means for intermittently introducing pressure fluid into inlet 30 at any desired periodic intervals automatically, thus ensuring that the orifice 20 is freed of obstructions without necessity for visual inspection.

It has been found that in some cases, particularly when relatively high pressures are required to expand outlet member 32, that a fluttering or vibration of the elastic outlet member may occur, which in some cases may be undesirable. This tendency to flutter or vibrate may be overcome by providing the resilient leaf spring reinforcements 38, 38 which provide resilient confining support for the expansible outlet member 32.

The exact size, shape, and configuration of tubular member 26 and outlet member 32 are not critical and will vary somewhat depending upon the purpose for which the particular outlet is intended. These members are preferably molded from a resilient, elastic, natural or synthetic rubber-like composition, and it is preferred that the wall thickness of outlet member 32 decrease gradually toward the exit end in order to give best results. Leaf spring members 38 are not essential for successful operation of the device but are preferred under certain conditions as pointed out above.

It should be noted that the embodiment described above for use in purifying paper pulp suspensions may be operated in any position, with restricted outlet orifice 20 directed either downwardly, sideways, or even vertically upwards.

Although a specific embodiment of the invention has been described herein, it is not intended to limit the invention solely thereto, but to include all of the obvious variations and modifications within the spirit and scope of the appended claims.

I claim:

1. Apparatus for separating solid particles from liquid suspensions comprising an elongated chamber of circular cross-sectional configuration provided with a restricted outlet passage at one end, a second outlet for withdrawing material from the other end of the chamber, means for introducing a stream of said suspension into said chamber adjacent said other end along a path tangential to the wall thereof, a flexible resilient sleeve disposed within said restricted outlet passage, the end of said sleeve adjacent said chamber being secured to the inner wall of said passage with the remainder of the sleeve extending toward the exit of the passage lying against the inner face thereof free to collapse radially inwardly, said sleeve terminating short of the exit end of said passage, and an inlet for introducing a stream of fluid under pressure through the wall of said restricted outlet passage behind the sleeve to collapse the sleeve radially and to flush the interior of said passage from said collapsed sleeve through the exit end of the passage.

2. Apparatus as defined in claim 1 in which the exit end of said restricted outlet passage comprises a radially elastically expansible wall of rubbery material.

3. Apparatus for separating solid particles from liquid suspensions comprising a chamber havng an end portion of generally conical configuration, means for introducing a stream of said suspension into said chamber along a path entering the base of said conical portion tangentially of the wall thereof, a first outlet adjacent the vertex of said conical portion, a second outlet adjacent the center of the opposite end of the chamber, a supplemental inlet for introducing a stream of fluid under pressure through the wall of said first outlet, and a check valve mounted in said first outlet, said check valve closing said supplemental inlet during normal operation of the apparatus and leaving open the passageway from said chamber through said first outlet and being movable solely by the pressure of fluid introduced through said supplemental inlet to a position closing said passageway between said chamber and said supplemental inlet permitting the fluid issuing through said supplemental inlet to pass outwardly through said first outlet.

4. Apparatus as defined in claim 3 in which the wall of said first outlet adjacent its exit end comprises elastic rubber-like material to permit radial enlargement thereof when subjected to internal pressure greater than normal operating pressure.

5. An outlet tip adapted to form the vertex outlet of a conical end of a cyclone separator for separating solid particles from liquid suspensions, said outlet tip comprising an elongated member having a passageway extending longitudinally therethrough and arranged for mounting on said conical end with the inlet end of said passageway in communication with said separator, at least that portion of said member adjacent the exit end of said passageway having a wall of elastic rubber-like material adapted to expand radially when the pressure within said passageway is increased, a supplemental inlet for fluid under pressure extending laterally through the wall of said member to communicate with said passageway, and a flexible resilient sleeve mounted coaxially within said passageway with its end adjacent the inlet end of said passageway secured to the inner wall of said passageway and with the remainder of said sleeve lying freely against said inner wall and overlying said supplemental inlet, said sleeve terminating short of the exit end of said passageway.

6. An outlet tip adapted to be used on the vertex outlet of a conical end of a cyclone separator for separating solid particles from liquid suspensions, said outlet tip comprising an elongated member having a passageway extending longitudinally therethrough and arranged for mounting on said conical end with the inlet end of said passageway in communication with said separator, at least that portion of said member adjacent the exit end of said passageway having a wall of elastic rubber-like material adapted to expand radially when the pressure within said passageway is increased, a supplemental inlet for fluid under pressure extending laterally through the wall of said member to communicate with said passageway, and a check valve mounted adjacent the juncture of said passageway and said supplemental inlet movable to and from a first position closing said supplemental inlet while leaving the passageway open from end to end and a second position closing said passageway between its inlet end and said supplemental inlet while leaving said supplemental inlet open to discharge through the exit end of said passageway.

References Cited in the file of this patent

UNITED STATES PATENTS

| | | |
|---|---|---|
| 301,228 | Gillespie | July 1, 1884 |
| 916,268 | Cameron | Mar. 23, 1909 |
| 2,225,840 | Newton | Dec. 24, 1940 |
| 2,421,977 | Allen | June 10, 1947 |
| 2,461,741 | Kochli et al. | Feb. 15, 1949 |
| 2,585,509 | Smith | Feb. 12, 1952 |
| 2,595,737 | Rotz | May 6, 1952 |
| 2,630,920 | Kerr | Mar. 10, 1953 |
| 2,786,642 | Comb | Mar. 26, 1957 |
| 2,809,567 | Woodruff | Oct. 15, 1957 |

FOREIGN PATENTS

| | | |
|---|---|---|
| 607,785 | Great Britain | Sept. 6, 1948 |
| 712,792 | Great Britain | July 28, 1954 |
| 868,952 | France | Oct. 20, 1941 |
| 177,277 | Austria | Jan. 11, 1954 |

OTHER REFERENCES

Chemical Engineering, vol. 62, No. 6, June 1955, pages 234–238.

Dorr-Oliver Publication Bulletin 2501, and sht. 2501A, copyright 1952.